(12) United States Patent
Whitman et al.

(10) Patent No.: US 12,026,766 B2
(45) Date of Patent: Jul. 2, 2024

(54) METHOD, MEDIUM, AND SYSTEM FOR ANALYZING PRODUCTS AND DETERMINING ALTERNATIVES USING ARTIFICIAL INTELLIGENCE

(71) Applicant: KYNDRYL, INC., New York, NY (US)

(72) Inventors: Todd Russell Whitman, Bethany, CT (US); John P. Perrino, Hedgesville, WV (US); Robert Eugene Coon, Bossier City, LA (US); Robert Ryan Gavin, Chicago, IL (US); Gary L. Osburn, Bernalillo, NM (US)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/449,644

(22) Filed: Sep. 30, 2021

(65) Prior Publication Data
US 2023/0099927 A1    Mar. 30, 2023

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 6,283,914 B1 | 9/2001 | Mansfield | |
| 10,108,784 B2 | 10/2018 | Zatvan | |
| 10,929,916 B2 * | 2/2021 | Abutair | G06F 16/9535 |
| 11,157,139 B2 * | 10/2021 | Yeh | G06Q 30/0643 |
| 2016/0014568 A1 * | 1/2016 | Naqvi | G06Q 30/0205 455/457 |
| 2017/0060405 A1 * | 3/2017 | Voss | G06F 3/04883 |
| 2018/0374567 A1 * | 12/2018 | Toumazou | G16H 20/60 |
| 2019/0073601 A1 * | 3/2019 | Alkan | G06N 20/00 |
| 2019/0279281 A1 * | 9/2019 | Kumar | G06Q 30/0631 |
| 2020/0265497 A1 | 8/2020 | Leifer | |

(Continued)

FOREIGN PATENT DOCUMENTS

| | | |
|---|---|---|
| WO | 2020069500 A1 | 4/2020 |
| WO | 2020163700 A1 | 8/2020 |
| WO | WO-2023180799 A1 * | 9/2023 ......... G06Q 30/0631 |

OTHER PUBLICATIONS

Chain Drug Review; "Drug chains' smartphone apps get smarter"; Aug. 5, 2013; Chain Drug Review 35.12: 34(1). Racher Press, Inc. (Year: 2013).*

(Continued)

*Primary Examiner* — Matthew E Zimmerman
(74) *Attorney, Agent, or Firm* — Dan Housley; Andrew M. Calderon; Calderon Safran & Wright, P.C.

(57) ABSTRACT

A product analyzing system and method may include receiving a scan of a product, retrieving a plurality of individual data of one or more individuals, determining how the product will affect the plurality of individual data of the one or more individuals and whether the product complies with the individual data of the one or more individuals, generating an alert corresponding to the product based on the determining, and sending the alert to a user device before purchase of the product.

20 Claims, 9 Drawing Sheets

(56) References Cited

U.S. PATENT DOCUMENTS

| | | |
|---|---|---|
| 2021/0118545 A1 | 4/2021 | Sathyanarayana |
| 2021/0233143 A1* | 7/2021 | Cho .................. G06Q 30/0635 |
| 2021/0248657 A1* | 8/2021 | Tilley ................ G06Q 30/0269 |
| 2021/0327582 A1* | 10/2021 | Joshi ...................... G16H 50/20 |
| 2022/0005066 A1* | 1/2022 | Muradia ............ G06Q 30/0241 |

OTHER PUBLICATIONS

Carpenter, Siri; Treating an Illness is One Thing. What About a Patient With Many?; https://www.nytimes.com/2009/03/31/health/31sick.html; Mar. 30, 2009; 3 pages.

Editorial Team; PointofSale.com; https://pointofsale.com/category/business-101/point-of-sale-and-payments/; Nov. 3, 2011; 12 pages.

Mell, Peter et al.; "The NIST Definition of Cloud Computing;" National Institute of Standards and Technology; Special Publication 800-145; Sep. 2011; 7 pages.

\* cited by examiner

METHOD, MEDIUM, AND SYSTEM FOR ANALYZING PRODUCTS AND DETERMINING ALTERNATIVES USING ARTIFICIAL INTELLIGENCE

BACKGROUND

Embodiments of the invention relate to the field of processing product information using artificial intelligence. More specifically, embodiments of the invention relate to using artificial intelligence to determine whether a product meets a user's multi-factor requirements, and notifying the user of the same, for example, by a notification or list of recommended alternative products.

SUMMARY

An embodiment of the present invention relates to a method, and associated computer system and computer program product, for analyzing products. One or more processors of a computer system receive a scan of a product. The one or more processors of the computer system retrieve a plurality of individual data of one or more individuals. An artificial intelligence system of the one or more processors of the computer system determines how the product will affect the plurality of individual data of the one or more individuals and whether the product complies with the plurality of individual data of the one or more individuals by processing, by the artificial intelligence system of the one or more processors of the computer system, the retrieved plurality of individual data. The one or more processors of the computer system generates an alert corresponding to the product based on the determining. The one or more processors of the computer system send the alert to a user device before purchase of the product.

DETAILED DESCRIPTION

Figure 1:
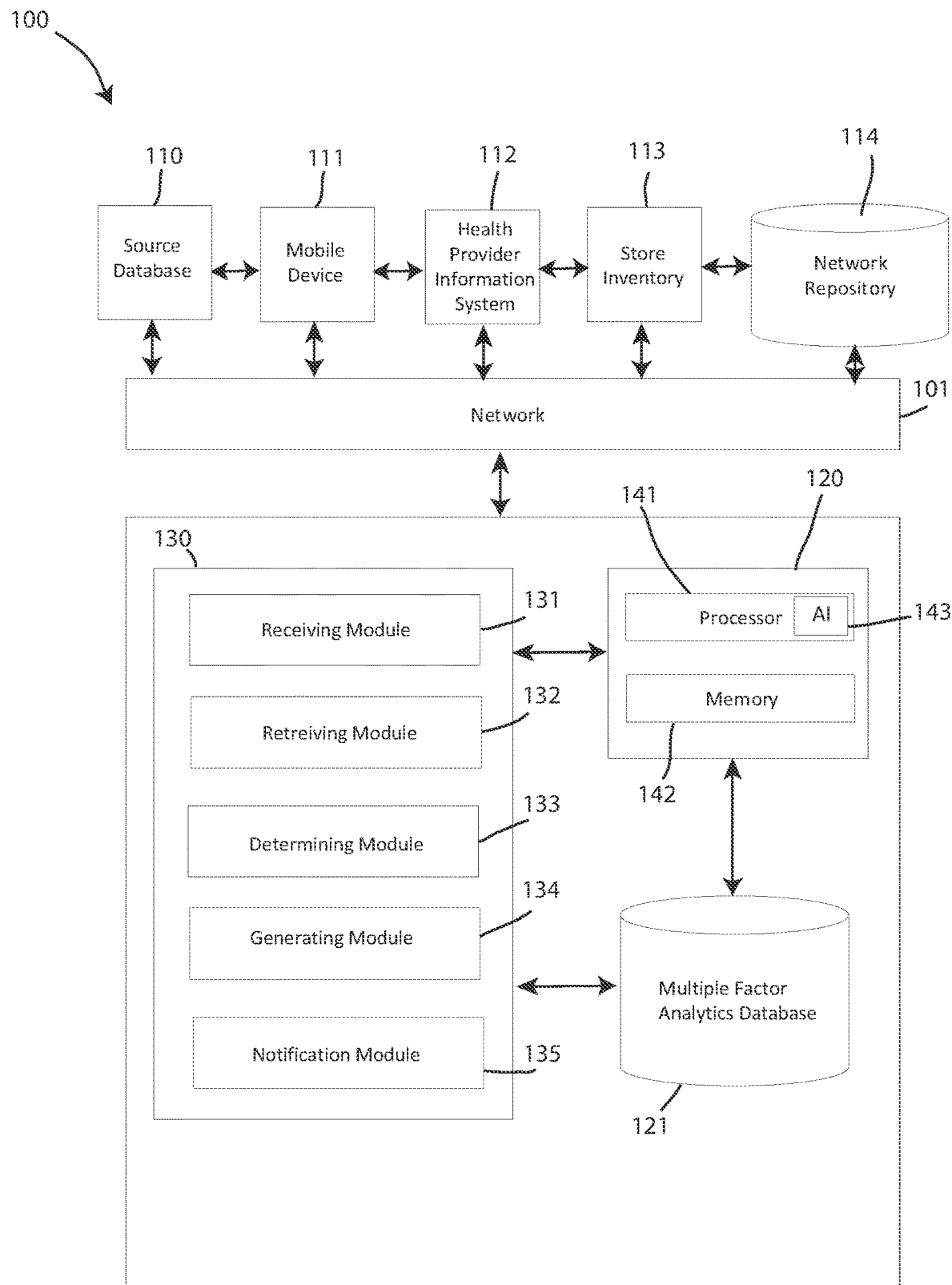
FIG. 1 depicts a block diagram of a system for analyzing a product, in accordance with embodiments of the present invention.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Users, such as shoppers, customers, patrons, or the like are conscientious about selecting products for themselves and their families. Products can include grocery items, retail items, consumer products, and the like including clothing, cleaning products, furniture, children's toys, technology, and the like whether in a physical retail or brick and mortar store or online retail or other shopping website, application, or the like. For example, with respect to grocery items, customers are discerning about their own health and the health of their family members. As another example, with respect to cleaning products, customers are discerning about chemicals, and may prefer natural ingredients. As yet another example, with respect to clothing and garments, customers are discerning about brands, sustainability, other user reviews, ethically sourced fabrics and materials, and the like. Users are also cost-conscious when shopping for products. Present methods do not provide for an easy way to determine if a product will meet a customer's multi-factor needs that correspond to their individual data. Individual data may include personal preferences as to ingredients, materials, geographic source, and other qualities about a product. Individual data may also include medical data such as medications and allergies. Individual data may further include personal goals such as budgeting, health goals such as weight maintenance or medical condition improvement, or support of small businesses and entrepreneurs. As an example, present methods do not provide an easy way to determine if a grocery item complies with health constraints or preferences of a user or their family members. For example, a shopper may be generally aware that fruits and vegetables are healthy, but may not be aware of how a particular fruit may negatively interact with their or their family members' current medications, such as negating benefits of medications, or increasing the likelihood of certain side effects of medications. For instance, a shopper may suffer from gout and take medications to treat their gout. Grapefruits and foods containing grapefruits may need to be avoided by this shopper because medication traditionally prescribed to treat gout is adversely affected by grapefruit, and can accordingly cause gout inflammation.

As another example, a user may need to prepare a meal for a large gathering, and the attendees may each have a multitude of medical conditions, dietary preferences, and personal goals about foods. A user may need to call or message or otherwise communicate with several attendees to learn these various constraints, and then keep track of these potentially conflicting constraints as they shop for foods to prepare a meal that all attendees can eat. As yet another example, certain family members may have personal goals, such as weight loss goals, dietary preferences such as religious observances, and medical conditions such as food allergies that all must be taken into account when shopping for one or more individuals.

Present processes of obtaining individual data such as medical data, dietary preferences, and personal goals for analyzing a product are time consuming and prone to human error because users need to keep track of multiple factors such as preferences and medical conditions, and users may need to perform research ahead of shopping to be aware of how products may affect their or their family members' individual data such as personal preferences, health, lifestyles, and goals. In an example of grocery or food items, this process becomes more and more complicated for users when family members have multiple chronic diseases and take multiple medications. Present processes may further be more costly for users who, being unsure about whether products will be suitable for each of their family members, may purchase products that cannot be returned, or, for example, that end up having an undesired affect to a family member's health condition, or that do not comply with certain family members' preferences. Present processes may permit a user to speed checkout by scanning products to show the price of the products, add the products to an electronic basket, and transmit the product information to a point-of-sale device, but these processes do not permit a user to analyze a product and determine if that product complies with individual data of themselves or others, and how the product will affect their or others' individual data. These processes further do not provide a user with recommended alternatives when a user has considered a product determined to be unsuitable because for example, it will negatively affect their individual data such as medical conditions, or does not comply with their individual data such as personal goals.

Thus, computer program products for analyzing products, and recommending product alternatives considering multiple factors would be well-received in the art. Embodiments of the present invention will help improve consumers' ability to quickly select products that are suitable for themselves and their family members or others, and meet theirs and their family members' or others' goals. Embodiments will permit checking of products for potential effects on for example, medical conditions, and for compliance with individual data, for example, compliance with dietary preference and personal goals, without a user having to put a product into a digital shopping cart or completing a purchase transaction first before being able to receive a determination of how the product will affect the user's individual data or whether the product complies with the user's personal data.

As an example with respect to a user considering a grocery item, an individual, such as a user, grocery shopper, or the individual's family member may be medically suffering from both high uric acid and elevated creatinine levels, and may be taking medication to control these conditions. Certain foods that are acceptable for one of those conditions could worsen the other condition. As an example, the individual may use an artificial intelligence process-based smartphone or Internet of Things ("IoT) application embodying one or more embodiments described herein to scan a UPC or enter a produce identification number of an orange. Product information about the orange may be received by one or more processors of a computer system, and the one or more processors of the computer system may determine that the orange would be beneficial to the individual's high uric acid, but detrimental to the individual's high creatinine levels. Accordingly, in an embodiment, the one or more processors of the computer system may generate one or more recommendations of grocery item alternatives such as cherries or blueberries which would not interfere with the medical conditions of the individual or their family member.

As another example, a user with multiple health factors may have a personal goal of losing ten pounds, and recent lab results indicating high blood pressure and low vitamin D. If the user scans granola bars, an artificial intelligence system such as artificial intelligence system 143 described hereinafter with respect to FIG. 1, of one or more processors of a computer system may determine whether the scanned granola bars will affect the user's medical conditions and comply with the user's personal goal, as well as whether the granola bars will affect the user's family members medical data and comply with their dietary preferences and personal goals. Granola bars may be determined to be compliant with two family members' dietary preferences and personal goals, and would not affect their medical conditions, however, the granola bars may be determined to be high in sugar and likely to negatively affect the user's medical data. The one or more processors of the computer system may accordingly generate a recommendation for an alternative, such as whole grain natural bars. Thereafter, retrieved updated lab and medical results in six months may indicate that the user has lost seven pounds, and that their vitamin D levels are within an acceptable range, but that the user's blood pressure is still elevated. Grocery items scanned at that time can be scanned to determine how they will affect the user's updated medical data.

Further, some embodiments will result in an improvement in computer technology by training, updating, and optimizing an artificial intelligence system of one or more processors of a computer system to identify preferred product or preferred alternative products of users based on previous product selection choices, and improve the accuracy of determinations of how product affect a plurality of individual data of one or more individuals, and whether products comply with a plurality of individual data of one or more individuals, as well as the accuracy of alternative products that are recommended.

Referring to the drawings, FIG. 1 depicts a block diagram of a system for analyzing a product 100, in accordance with embodiments of the present invention. Embodiments of a system for analyzing a product 100 may be described as a system for determining product alternatives considering multiple factor analytics. Embodiments of a system for analyzing a product 100 may be described as a system for using point of sale multiple factor analytics prior purchase to improve decision making and avoid issues with individual data, such as, in an embodiment wherein the product is a grocery item, medical conditions, medication or supplement interactions and promote healthy lifestyles. The system for analyzing a product 100 may receive individual data from a user for example by a user's mobile device 111. A user may open a mobile application that interfaces with, couples to, or is in communication with the system for analyzing a product. In an embodiment, a user may be prompted to enter medical condition information, current medications being taken, allergies, and the like. A user may further upload the user's medical records such as lab tests, blood test results, blood pressure measured at recent doctor visits, and the like. In embodiments, the system may receive individual data such as dietary preference information from the user such as religious dietary restrictions, vegan or vegetarian dietary restrictions, diet plan restrictions, or organic or natural ingredient preferences. In further embodiments, the system may receive personal goals information from the user such as weight loss goals of the user, medical condition improvement goals, product sustainability goals, budgeting goals, or health condition maintenance goals of the user. The system 100 may receive individual data from the user that correspond to the user, as well as the user's family members or others such as friends, coworkers, classmates, and other groups. In an embodiment, the system may enable a user to link, associate, connect, and the like, their medical condition, dietary preference, and personal goals information to other family members' information, for example, to create a family or defined group of individuals database such as multiple factor analytics database 121 described hereinafter. The system 100 may enable a user to link, associate, connect, and the like, their individual data such as medical condition, dietary preference, and personal goals information to more than one group of other individuals, which group the user could select when shopping. For example, when grocery shopping for a dorm room, a student user could select themselves and their roommate when using the system 100, or, if visiting family on school break, could select themselves and their family members when using the system. As another example, when considering products that are grocery items, a user could select themselves and other individuals such as friends or coworkers attending a meal when using the system 100 to shop for that meal, and then select themselves and their family members when only shopping for themselves and their family members or others with whom the user lives. In an embodiment, the system 100 may receive medical data directly from health providers such as health provider information systems 112 (described hereinafter) such as hospitals, doctor's offices, urgent care facilities, and the like, when required permissions regarding personal medical data are provided by the user.

Embodiments of the system for analyzing a product 100 may comprise a mobile device 111 communicatively coupled to a computer system 120 over a network 101. While only one mobile device 111 is shown, the number of mobile devices 110 connecting to the computer system 120 over the network may vary from embodiment to embodiment. Embodiments of the mobile device 111 may include a computing device, such as a smartphone or tablet device, associated with or operated by the user. The mobile device 111 may also be a wearable device such as a smart watch or the like. The mobile device 111 may run various applications that contain data about the user such as weight loss or maintenance apps, food tracker apps, health provider apps, budgeting apps, photo sharing apps, social media apps, or the like. A user's mobile device may be used as a scanner, and may also use for example, the device's camera to send information to the computer system 120. Moreover, the mobile device 111 may be communicatively coupled to the computer system 120, and may transmit information over the network 101. The mobile device 111 may include one or more hardware components for sending/receiving geolocation data of the mobile device 111. The mobile device 110 may include a number of input devices for providing or inputting information to computer system 120 over the network 101. For example, the mobile device 111 may include a Bluetooth system, or other transmitting system configured to provide information from the mobile device 111 into the system 100. Input devices of the mobile device 111 may include an accelerometer, a gyroscope, a GPS system, biometric sensor, a wearable sensor, a microphone, a peripheral device, or the like. Biometric sensors of the mobile device 111 may also include a heart rate monitor used to track a current or historical average heart rate of the user; wireless-enabled wearable technology, such as an activity tracker or smartwatch that tracks a heart rate; a blood pressure monitor; a perspiration sensor; and other wearable sensor hardware.

Information provided by the mobile device 111 to the computer system 120 may be product information from a camera enabled scan of the product, location information acquired by the input devices of the mobile device 111. The mobile device 111 may transmit a plurality of individual data of one or more individuals, for example, individual data pertaining to medical data, dietary preferences, and personal goals, as well as product information by connecting to computer system 120 over the network 101.

A network 101 may refer to a group of two or more computer systems linked together. Network 101 may be any type of computer network known by individuals skilled in the art. Examples of computer networks 101 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 101 may be a peer-to-peer network in some embodiments, wherein in other embodiments, the network 101 may be organized as a client/server architecture.

In some embodiments, the network 101 may further comprise, in addition to the computer system 120 and the mobile device 111, a connection to one or more network accessible knowledge bases containing information of one or more users, network repositories 114 or other systems connected to the network 101 that may be considered nodes of the network 101. In some embodiments, where the computer system 120 or network repositories 114 allocate resources to be used by the other nodes of the network 101, the computer system 120 and network repository 114 may be referred to as servers.

The network repository 114 may be a data collection area on the network 101 which may back up and save all the data transmitted back and forth between the nodes of the network 101. For example, the network repository 114 may be a data center saving and cataloging user data sent by the mobile device 111 to generate both historical and predictive reports regarding a user's purchasing habits, shopping habits, preferences, movement or navigational habits of the user through one or more retail environments. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

The system 100 may include a source database 110 of confirmed, trusted, peer reviewed, or the like, information regarding how products affect individual data such as medications taken, health conditions, and the like, for example, regarding medical conditions, medications, grocery item compositions such as ingredients, nutrition facts, preparation settings, or the like, and how particular grocery items affect those medical conditions, medications, and the like. For example, the source database 110 may include information about product geographic origin, product materials, product reviews, or the like. For example, in the instance of grocery item products, the source database 110 may include information about whether a grocery item includes or is prepared in a factory setting that includes nuts, soy, dairy, or other ingredients to which users may have allergies.

The system for analyzing products 100 may include health provider information systems 112 such as databases, platforms, websites, applications, or the like that contain individual medical data about users of the system 100, such as lab test results, medical conditions, prescribed medications, or the like. The system 100 may further include a product inventory 113 repository, database, or the like that includes information about which products are in stock at various stores, shops, boutiques, online shops, third party seller sites, farmers' markets, or the like, that can be used to generate recommendations of alternative products.

Embodiments of the computer system 120 may include a receiving module 131, a retrieving module 132, a determining module 133, and a generating module 134, and a notification module 135. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the receiving module 131 may include one or more components of hardware and/or software program code for receiving a scan of a product, such as an image scan of a product by a camera of a mobile device 111. A product may be scanned by using the camera of a user's mobile device 111 to scan a product's Universal Product Code (UPC), a QR code printed on a product or a product's packaging, an item label of a display of the product, and the like. In embodiments, a product may be scanned by placing the product within a view of the camera of a mobile device 111 and use of image recognition by the mobile device 111 to identify the product. In further embodiments, a product can be identified by a user's search of the source database 110 to identify the product being considered, such as by search term words, and the result of the search may be received by the receiving module 131, for example, upon search result confirmation by the user.

The receiving module 131 may provide information received by the computer system 120 from the mobile device 111 to be stored in the multiple factor analytics database 121 which is in communication with the receiving module 131. The receiving module 131 or an additional receiving module of the computer system 120 may be configured to receive individual data, for example, medical data, personal preferences, and personal goals from a user for example, from a user's mobile device 111, and this information may be stored in the multiple factor analytics database 121. The receiving module 131 or an additional receiving module of the computer system may receive updated individual data of a user. In embodiments, received updated individual data of a user may supplement or replace existing individual data stored for example in the multiple factor analytics database. As an example, if a user begins taking a new medication in addition to their existing medication regimen, the new medication would be added to the user's medical data; however, if the new medication was replacing a user's existing stored medication, that existing medication would be removed so that it is determinable how future considered products will affect the new medication.

As another example, if a user reaches their goal weight, the user may update their personal goal from "lose ten pounds" to "maintain current weight." As yet another example, if a user decides to purchase recycled clothing from thrift shops or community used clothes marketplaces, a user's individual data may be updated to reflect this personal preference or personal goal.

In embodiments of the present invention, "products" may include retail items and consumer products such as clothing, cosmetics, cleaning products, furniture, automotive goods, or the like, and may further include services such as cleaning services, clothing alteration services, medical services, or the like. As an example, products that are "grocery items" may include food items such as produce (e.g. fruits and vegetables), meats, poultry, seafood, nuts, legumes, bakery items, processed foods or the like, ingredients such as flours, spices, sauces, seasonings, oils, condiments, or the like, and beverages such as coffee, sports drinks, soda, enhanced water, teas, alcoholic beverages, or the like. In some embodiments, products that are grocery items may further include personal hygiene products such as toothpaste, deodorant, shampoo, lotion, ointments, and the like. In some embodiments, products that are grocery items may further include vitamins, supplements, over-the-counter medications such as cold medicine, ibuprofen, acemetacin, allergy relief, cough suppressant, or the like.

In an embodiment, the receiving module 131, or an additional receiving module of the computer system 120 may receive a selection choice by the user of the product or recommended alternative product. For example, in an embodiment in which a shopper is considering a grocery item, if the aforementioned shopper having high uric acid and high creatinine levels considering purchase of an orange selects and purchases the orange despite an alert as to the negative effects on the high creatinine levels, that selection choice may be received by the receiving module 131 or an additional receiving module of the computer system. Or, if the shopper selects one or more of the recommended alternatives of cherries or blueberries, this selection choice may be received by the receiving module 131 or an additional receiving module of the computer system. The receiving module 131 and additional receiving modules of the computer system 120 may provide information received by the computer system 120 from the mobile device 111 to be stored in the multiple factor analytics database 121 which is in communication with the receiving module 131.

Embodiments of the retrieving module 132 may include one or more components of hardware and/or software program code for retrieving individual data such as medical data, personal preferences, and personal goals of one or more individuals. Embodiments of the retrieving module 132 may retrieve individual data from a user's mobile device 111 where a user may input and update their individual data such as medical data, personal preferences, and personal goals, or for example, from the health provider information systems 112. The retrieving module 132 may retrieve users' personal preferences from users' mobile devices 111 where users may input and update these preferences. The retrieving module 132 may retrieve user individual data such as medical data, personal preferences, and personal goals from the multiple factor analytics database 121 which is in communication with the retrieving module 132, which may store individual data such as medical data, personal preferences, and personal goals received by the computer system 120 from the mobile device 111.

Referring still to FIG. 1, embodiments of the computer system 120 may further include a determining module 133 for determining how a product will affect the individual data of one or more individuals. For example, determining module 133 may determine how a product will affect medical data of a user or the user's family members, whether the product complies with the dietary preferences of the user or the user's family members, whether the product complies with the personal goals of the user or the user's family members or others, and the like. The determining module 133 may use an artificial intelligence system 143 of the computer system 120, such as an artificial intelligence system 143 of one or more processors 141 of the computer system 120, to process individual data of one or more individuals retrieved by the retrieving module 132.

In embodiments, the artificial intelligence system 143 may be embodied in a module of the computer system 120. The artificial intelligence system 143 may be executable by one or more processors 141 of the computer system. In embodiments, the artificial intelligence system 143 may be executed to train the computer system 120 to identify a plurality of alternative products for recommendation to a user based on previously received selection choices of a user of a product or a recommended alternative product. Previously received selection choices made by a user of a product or an alternative product may be retrieved for example, from the multiple factor analytic database 121 by the retrieving module 132 or an additional retrieving module of the computer system 120.

The determining module 133 is configured to determine whether a product negatively affects, positively affects, or does not affect a user's or a user's family members' individual data. As an example, the determining module 133 may be configured to determine whether a product negatively affects, positively affects, or does not affect a user's medical conditions, including one or more medical conditions, medications, allergies, and the like. For example, a consumer may have an allergy to acrylic, or synthetic fibers and the determining module 133 may be configured to determine whether an item of clothing being considered by the consumer will trigger the consumer's allergies. The determining module 133 is configured to further determine whether a product will comply with the individual data, for example, whether a grocery item will comply with dietary preferences and personal goals such as weight loss goals or health condition maintenance goals of a user or a user's family members or others.

In some embodiments, a product may be analyzed with respect to the individual data of a single individual. In other embodiments, a product may be analyzed with respect to individual data for each individual of a defined group of individuals, and the determining module 133 may determine how the product will affect a plurality of individual data and whether the product will comply with a plurality of individual data of each individual of the defined group of individuals.

In embodiments of the invention the determining module 133 may be configured to determine how a product will affect updated individual data of one or more individuals, and whether the product will comply with the updated individual data of the one or more individuals.

Embodiments of the generating module 134 may include one or more components of hardware and/or software program code for generating an alert corresponding to the product based on the determining performed by the determining module 133. An alert may be a notification, an alarm, a push notification, a pop-up, or the like. The alert may indicate that a product such as a grocery item would negatively affect a medical condition, negatively interact with medication, trigger an allergy, or the like of the user or a user's family member, does not comply with the user's or the user's family members' dietary preferences, or does not comply with the user's or the user's family members' personal goals. For example, a grocery item such as cookies, cake, or processed foods may not comply with a user's weight maintenance or natural food preferences. An alert may indicate that a grocery item would positively affect a user's or user's family's medical conditions, or not affect the user's or user's family's medical conditions, that the grocery item will not negatively interact with the user's medication, or that the grocery item complies with the user's or user's family's dietary preferences and personal goals. For example, a naturally flavored water or organic spinach may comply with a user's weight loss goals and organic food preferences, and may not trigger a user's peanut allergy. An alert may include information about why the specific alert has been given, for example, whether the alert is based on a negative or positive or neutral affect on medical data of a user, or with which dietary preference or personal goal the grocery item does or does not comply. In embodiments of the invention, the generating module 134 may generate one or more recommendations for an alternative product based on the determining by the determining module 133. Returning to the example embodiment in which a product is a grocery item, if the determining module 133 determines that a grocery item would negatively interact with a user's medication, an alert corresponding to that negative interaction may be generated as well as a recommendation of an alternative grocery item, for example a similar grocery item that would not negatively interact with a user's medication. As an example, if a user has a peanut allergy, the determining module 133 may determine that a particular pre-packaged cookie is prepared in a factory that may also process peanuts and other nuts. The generating module 134 may generate a list of alternative recommended cookies that do not contain peanuts and are not prepared in a factory that also processes peanuts and other nuts.

The notification module 135 may include one or more components of hardware and/or software program code for sending the alert corresponding to a grocery item to a user's mobile device 111, for example, before the user purchases the product. The notification module 135 may include one or more components of hardware and/or software program code for sending a list of recommended alternative products to a user's mobile device 111.

In further embodiments of the present invention, the artificial intelligence system 143 of one or more processors 141 of the computer system 120 may iteratively process updated previously received selection choices to train, update, and optimize the artificial intelligence system 143 to identify preferred products or preferred alternative products of for example, a particular user or family members of the user, based on correlations between previously generated alerts corresponding to the product or previously generated recommendations of alternative products, and updated previously received selection choices. In embodiments of the present invention, the artificial intelligence system 143 may be integrated with IBM® Watson Health® AI Healthcare Solutions, and for example, be embodied in a mobile application or IoT application.

While a user's family members have been referenced herein, a plurality of individual data, such as medical data, dietary preferences, and personal goals may refer to a single individual, one or more individuals, a plurality of individuals, a defined group of individuals, any combination of individuals, and the like. For example, friends, relatives, coworkers, acquaintances, contact lists, attendees of events, or the like.

Referring still to FIG. 1, embodiments of the computer system 120 may be equipped with a memory device 142 which may store individual data, updated individual data, product selection choices, alternative product selection choices, and the like, and a processor 141 for implementing the tasks associated with the system for determining grocery item compliance analyzing products 100.

Figure 2:
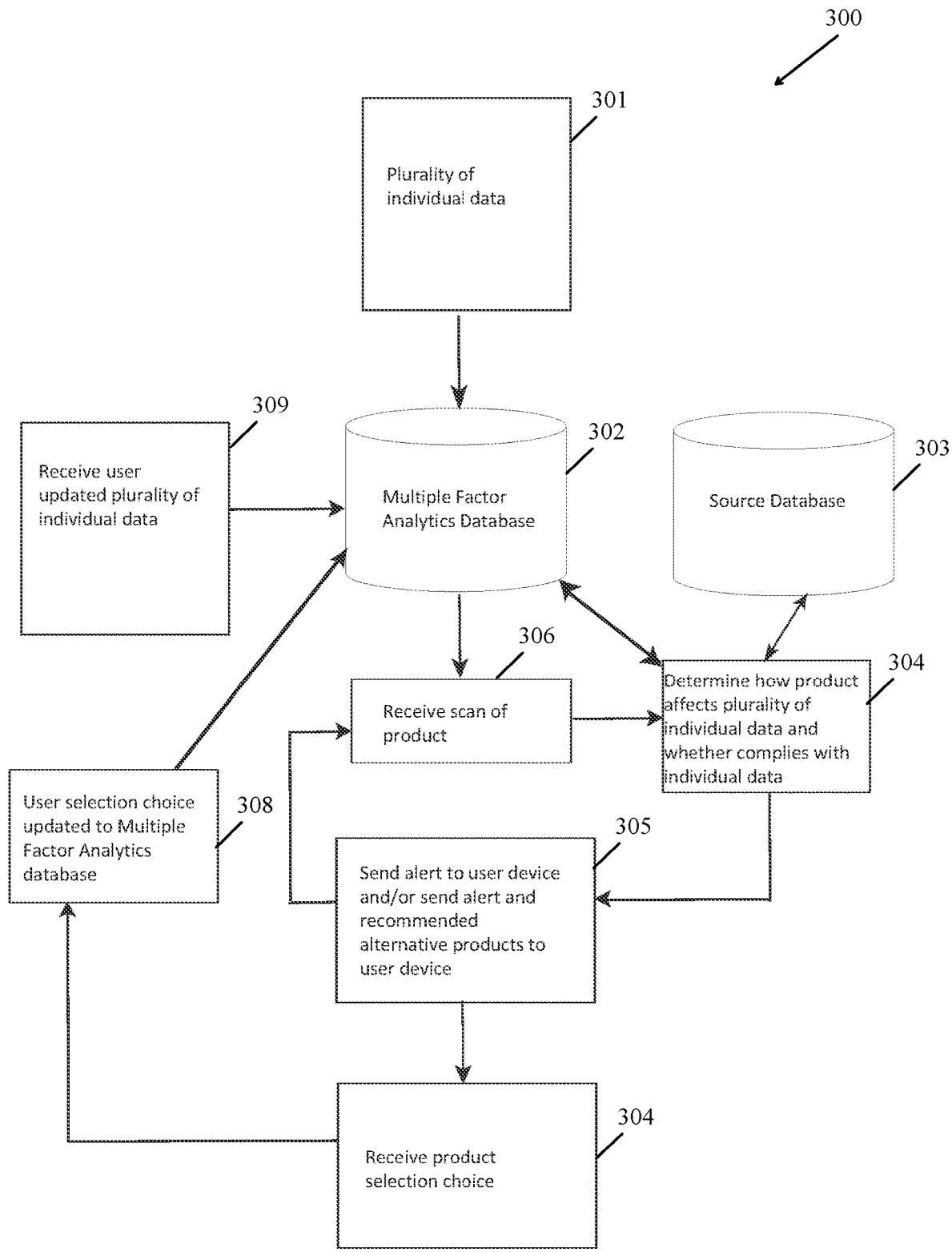
FIG. 2 depicts a block diagram of a system for analyzing a product in accordance with embodiments of the present invention.

Referring now to FIG. 2, a block diagram of a system for analyzing a product in accordance with embodiments of the present invention is shown. A multiple factor analytics database 302 may receive individual data, for example, medical data, dietary preference, and personal goal information 301 from one or more individuals such as from one or more individuals' mobile devices 111. The multiple factor analytics database 302 may receive updated individual data for example, medical data, dietary preferences, and personal goals as well. Further, the multiple factor analytics database 302 may receive product selection choice information for grocery items and alternative product selection choices made by users 307. In embodiments, in response to a scan of a product by a user 306, an artificial intelligence system such as artificial intelligence system 143 determines 304 how the product will affect a plurality of individual data of the one or more individuals, and whether the product complies with the plurality of individual data by processing, by the artificial intelligence system the retrieved medical data, dietary preferences, and personal goals. The artificial intelligence system may receive or retrieve information from the multiple factor analytics database 302 as well as a source database 303 such as source database 110 including for example, personal goals of a user and product composition information for a scanned product. In embodiments of the present invention a notification of an alert and/or a recommendation of an alternative product may be sent to a user 305. For example, an application on a user's mobile device 111 may display a notification a pop-up, a push notification or the like indicating the alert and/or recommended alternative product before the user purchases the scanned product.

The sending of an alert to a user such as to the user's mobile device 111 before the user purchases the scanned product may be described as "real-time" analyzing of a product. For example, a user, such as user 401 described herein after with respect to FIG. 6, considering a product 403 (shown and described hereafter as well with respect to FIG. 6), may scan the product in the store, during online shopping, or the like, and receive an alert indicating how the product will affect their individual data and whether the product complies with their individual data before they check out or make a purchase, such that the user 401 can be certain that for example, a grocery item does not negatively interfere with their medication, fail to meet religious observances of the user 401, or negatively affect their weight maintenance goals, or the like. An advantage provided thereby is improved decision-making capabilities.

Figure 5:
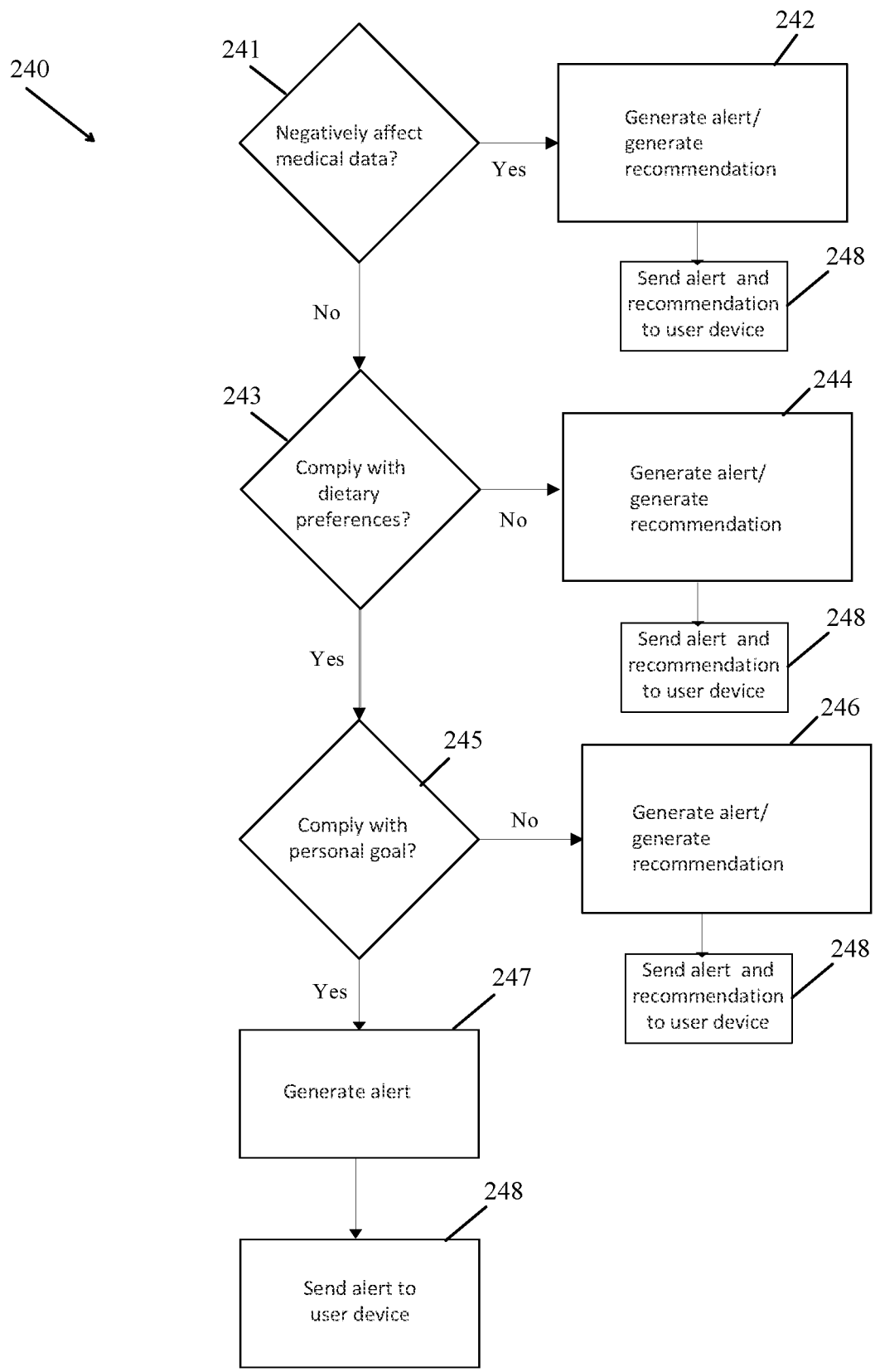
FIG. 5 depicts a flow chart of a step of a method for analyzing a product, in accordance with embodiments of the present invention.

FIG. 5 depicts a flow chart of a method 200 for analyzing a product, in accordance with embodiments of the present invention. The method 300 may include a step of receiving, by one or more processors, such as processor 141, of a computer system, such as computer system 120, a scan of a product. The method 200 may include a step 211 of retrieving, by the one or more processors of the computer system, a plurality of individual data of one or more individuals, for example, medical data, dietary preferences, and personal goals of one or more individuals, such as user 411. The method 200 may include a step 212 of determining, by an artificial intelligence system, such as artificial intelligence system 143, of the one or more processors of the computer system, how the product will affect the plurality of individual data and whether the product complies with the individual data by processing, by the AI system of the one or more processors of the computer system the retrieved plurality of individual data. If the artificial intelligence system of the one or more processors of the computer system determines in determining step 212 that the product negatively affects the plurality of individual data of the one or more individuals, or does not comply with the plurality of individual data of the one or more individuals, in a step 213 the method may include generating, by the one or more processors of the computer system, an alert corresponding to the product based on the determining. As an example, the alert may indicate that the product negatively affects an individual's medical data, or does not comply with the dietary preferences of the individual, or does not comply with the personal goals of the one or more individuals. If the artificial intelligence system of the one or more processors of the computer system determines in the determining step 212 that the product positively affects, or does not affect the one or more individuals' plurality of individual data, and complies with the plurality of individual data, in a step 214 the method may include generating, by the one or more processors of the computer system, an alert corresponding to the product based on the determining. As an example, the alert may indicate that a product positively affects, or does not affect the one or more individuals' medical data, complies with the one or more individuals' dietary preferences, and complies with the one or more individuals' personal goals. The method 200 may include the further step 215 of sending, by the one or more processors of the computer system, the alert to a user device before purchase of the product. In embodiments of the present invention, the method 200 may include a step 216 of generating, by the one or more processors of the computer system, a recommendation for an alternative product based on the determining. For example, one or more recommendations may be generated if the product negatively affects the plurality of individual data of the one or more individuals, or does not comply with the individual data of the one or more individuals.

Figure 4:
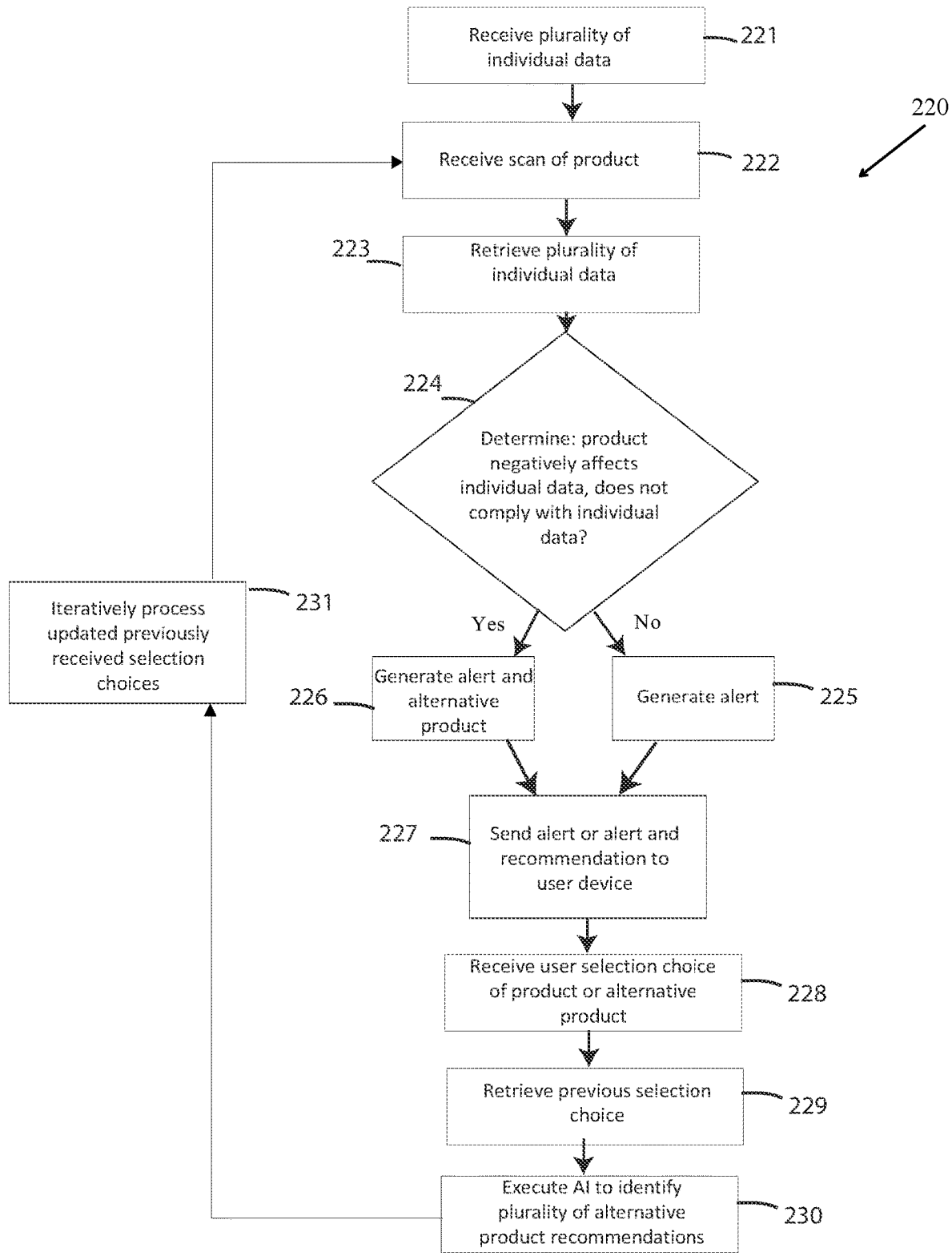
FIG. 4 depicts a flow chart of a method for analyzing a product, in accordance with embodiments of the present invention.

FIG. 4 depicts a flow chart of a method 220 for analyzing a product, in accordance with embodiments of the present invention. The method 220 may include a step 221 of receiving, by one or more processors, such as processor 141, of the computer system, such as computer system 120, a plurality of individual data of one or more individuals. The method 220 may include a step 222 of receiving, by the one or more processors of the computer system, a scan of a product. The method 220 may include a step 223 of retrieving, by the one or more processors of the computer system, the plurality of individual data of the one or more individuals, such as user 411. The method 220 may include a further step 224 of determining, by an artificial intelligence system of the one or more processors of the computer system, how the product will affect the plurality of individual data of the one or more individuals, and whether the product complies with the plurality of individual data of the one or more individuals by processing, by the artificial intelligence system of the one or more processors of the computer system the retrieved plurality of individual data. The method 220 may include a step 225 of generating, by the one or more processors of the computer system, an alert corresponding to the product based on the determining. The method 220 may include a further step 226 of generating, by the one or more processors of the computer system, a recommendation for an alternative product. The method 220 may include a further step 227 of sending, by the one or more processors of the computer system the alert to a user device before purchase of the product. In an embodiment, the method 220 may include a step 228 of receiving, by the one or more processors of the computer system, a selection choice made by a user, of the product or the alternative product. The method 220 may include a step 229 of retrieving, by the one or more processors of the computer system, a previously received selection choice made by a user, of the product or the alternative product. Another step 230 of the method may include executing the artificial intelligence system of the one or more processors to train the computer system to identify a plurality of alternative products for recommendation based on the retrieved previously received selection choices made by the user, of the product or alternative product. The method 220 may include yet another step 231 of iteratively processing, by the artificial intelligence of the one or more processors of the computer system, updated previously received selection choices to train, update, and optimize the AI system to identify preferred products or preferred alternative products based on correlations between previously generated alerts corresponding to the product or previously generated recommendations of alternative products, and updated previously received selection choices. In embodiments of methods, such as methods 200, 220 of the present invention, the determining may include determining, by the one or more processors of the computer system, how the product will affect an updated plurality of individual data of the one or more individuals and whether the product complies with the updated plurality of individual data of the one or more individuals.

In embodiments of methods, such as methods 200, 220 of the present invention, the one or more individuals is a defined group of individuals, and the determining includes determining, by the one or more processors of the computer system, product will affect an updated plurality of individual data of each individual of a defined group of individuals and whether the product complies with the updated plurality of individual data of the one or more individuals. In embodiments of methods, such as methods 200, 220 of the present invention, the product may be a grocery item, and the plurality of individual data of one or more individuals or each individual of a defined group of individuals may include medical data, dietary preferences, and personal goals, and the medical data may include medical health conditions of one or more individuals or each individual of a defined group of individuals, medications taken by one or more individuals or each individual of a defined group of individuals, lab test results for one or more individuals or each individual of a defined group of individuals, or allergies of one or more individuals or each individual of a defined group of individuals, the dietary preferences may include religious dietary restrictions of one or more individuals or each individual of a defined group of individuals, vegan or vegetarian dietary restrictions of one or more individuals or each individual of a defined group of individuals, diet plan restrictions of one or more individuals or each individual of a defined group of individuals, or organic or natural ingredient preferences of one or more individuals or each individual of a defined group of individuals, and the personal goals may include weight loss goals of one or more individuals or each individual of a defined group of individuals, medical health condition improvement of one or more individuals or each individual of a defined group of individuals, or health condition maintenance of one or more individuals or each individual of a defined group of individuals.

FIG. 5 depicts a flow chart of an embodiment of a determining step 240, such as determining step 212, 224 in which a user is considering purchase of a product that is a grocery item. In a step 241, the one or more processors, such as processor 141 of the computer system, such as computer system 120 determine whether the scanned grocery item negatively affects medical data of one or more individuals. If the one or more processors of the computer system determine that the grocery item will negatively affect the one or more individuals' medical data, the one or more processors of the computer system may generate 242 an alert indicating that the grocery item will negatively affect the medical data of the one or more individuals and/or generate one or more recommendations for alternative grocery items that will not negatively affect the one or more individuals' medical data. If the one or more processors of the computer system determine that the grocery item will positively affect, or will not affect the medical data of the one or more individuals, the one or more processors of the computer system may further determine 243 whether the grocery item complies with the one or more individuals' dietary preferences. If the one or more processors of the computer system determine that the grocery item does not comply with the one or more individuals' dietary preferences, the one or more processors of the computer system may generate 244 an alert indicating that the grocery item does not comply with the dietary preferences of the one or more individuals and/or generate one or more recommendations for alternative grocery items that will comply with the one or more individuals' dietary preferences. If the one or more processors of the computer system determine that the grocery item complies with the one or more individuals' dietary preferences, the one or more processors of the computer system may further determine 245 whether the grocery item complies with the one or more individuals' personal goals. If the one or more processors of the computer system determine that the grocery item does not comply with the personal goals of the one or more individuals, the one or more processors of the computer system may generate 246 an alert indicating that the grocery item does not comply with the personal goals of the one or more individuals and/or generate one or more recommendations for alternative grocery items that comply with the personal goals of the one or more individuals. If the one or more processors of the computer system determine that the grocery item complies with the one or more individuals' personal goals, the one or more processors of the computer system may generate 247 an alert indicating that the grocery item will not negatively affect the one or more individuals' medical data, and complies with the dietary preferences and personal goals of the one or more individuals. In response to the generation of the alerts or recommendations in any of steps 242, 244, 246, 247, the one or more processors of the computer system may send 248 the corresponding alert and/or recommendation to a user device, such as in steps 215, 227 of methods 200, 220 in accordance with embodiments of the present invention.

Figure 6:
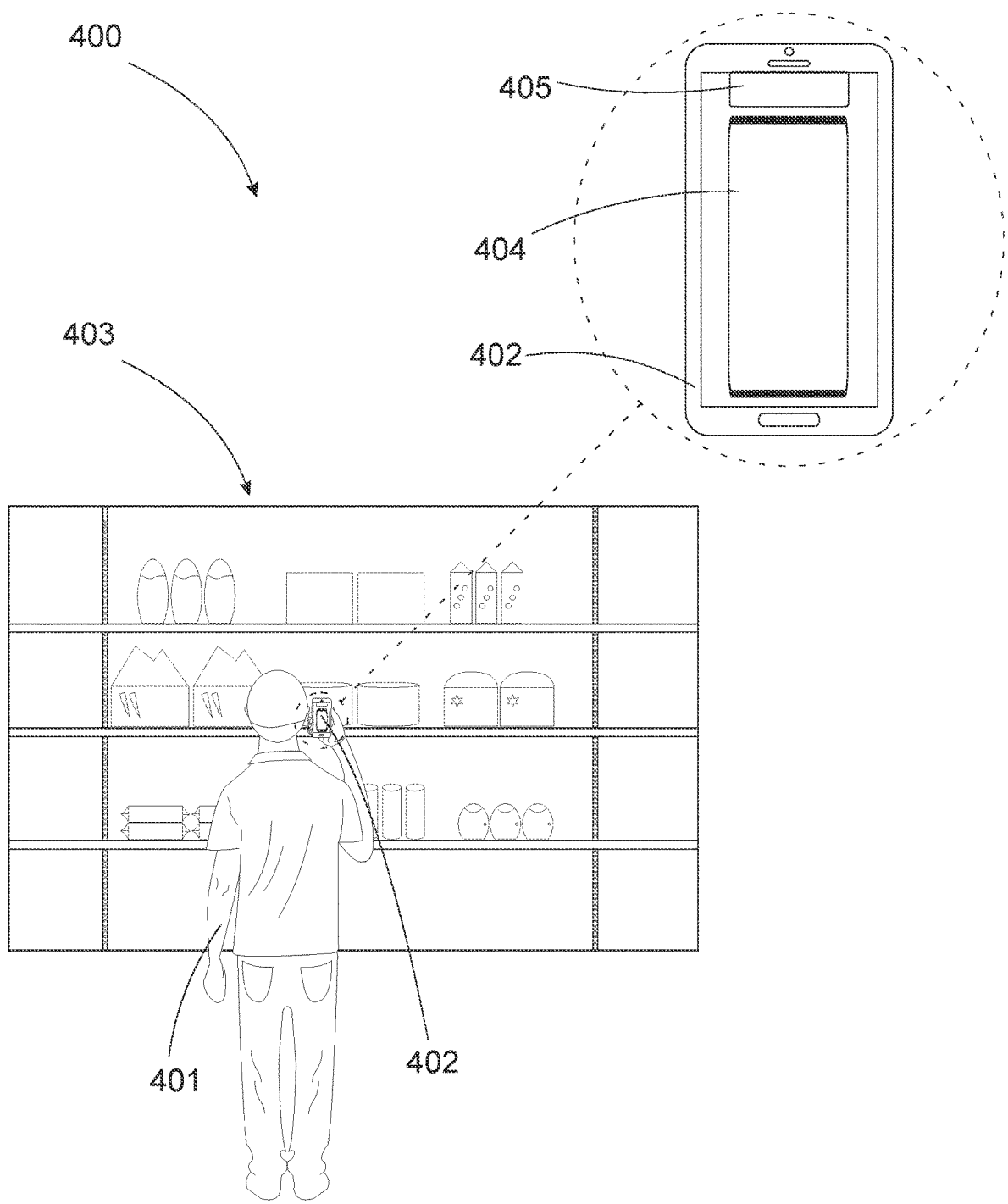
FIG. 6 depicts a perspective view of a user mobile device being used to analyzing a product, in accordance with embodiments of the present invention.

FIG. 6 depicts a perspective view of a user 411 using a mobile device 402, such as user device 211, to analyze a product, in accordance with embodiments of the present invention. In this embodiment, the user 411 is in a store 400. The user 411 may use the mobile device 402 to scan a product 403, and an alert 405 and/or recommendation of an alternative product 404 may be sent to the user device 402 within system 100 before the user 411 purchases the product 403.

In embodiments of the present invention, a smartphone or IoT application may enable further capabilities, such as graphing individual and family member medical data over time such as retrieved lab results, blood test results, and the like, listing grocery items scanned and determined to be or not to be compliant, and listing grocery items and recommended alternative grocery items purchased by a user, personal goal tracking for individuals and family members, and medication and supplement history tracking for individuals and family members.

Figure 3:
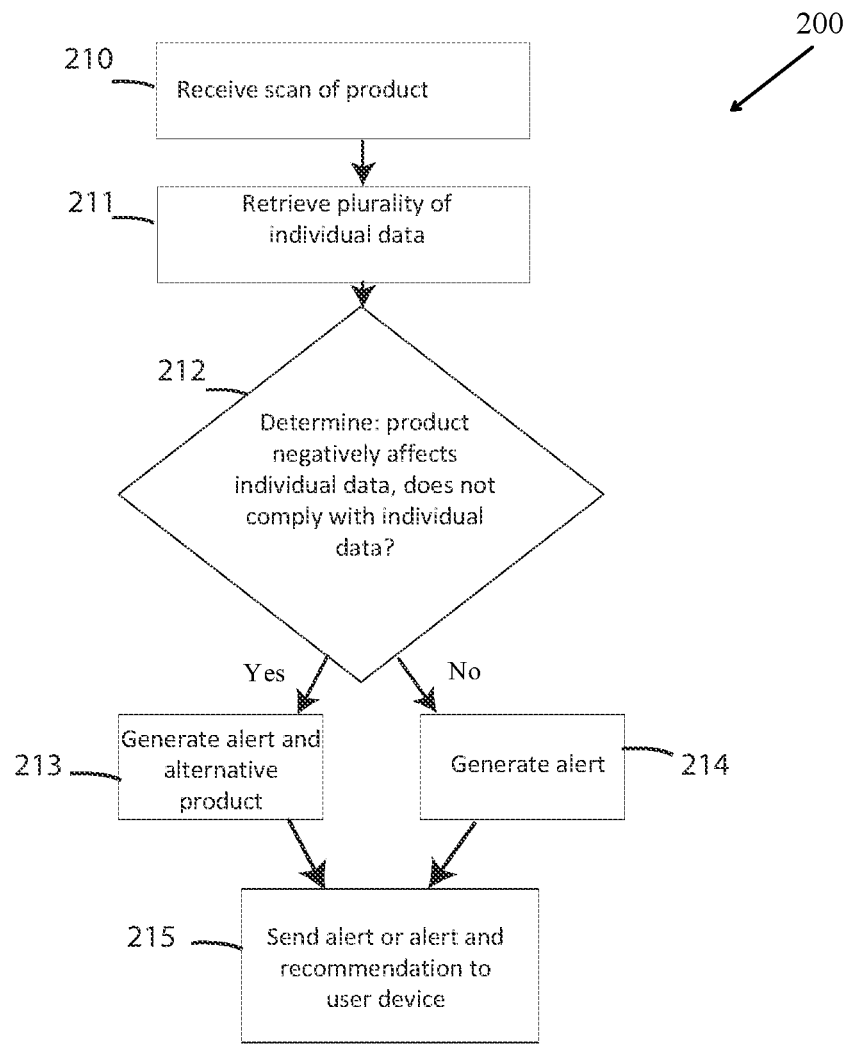
FIG. 3 depicts a flow chart of a method for analyzing a product, in accordance with embodiments of the present invention.
Figure 7:
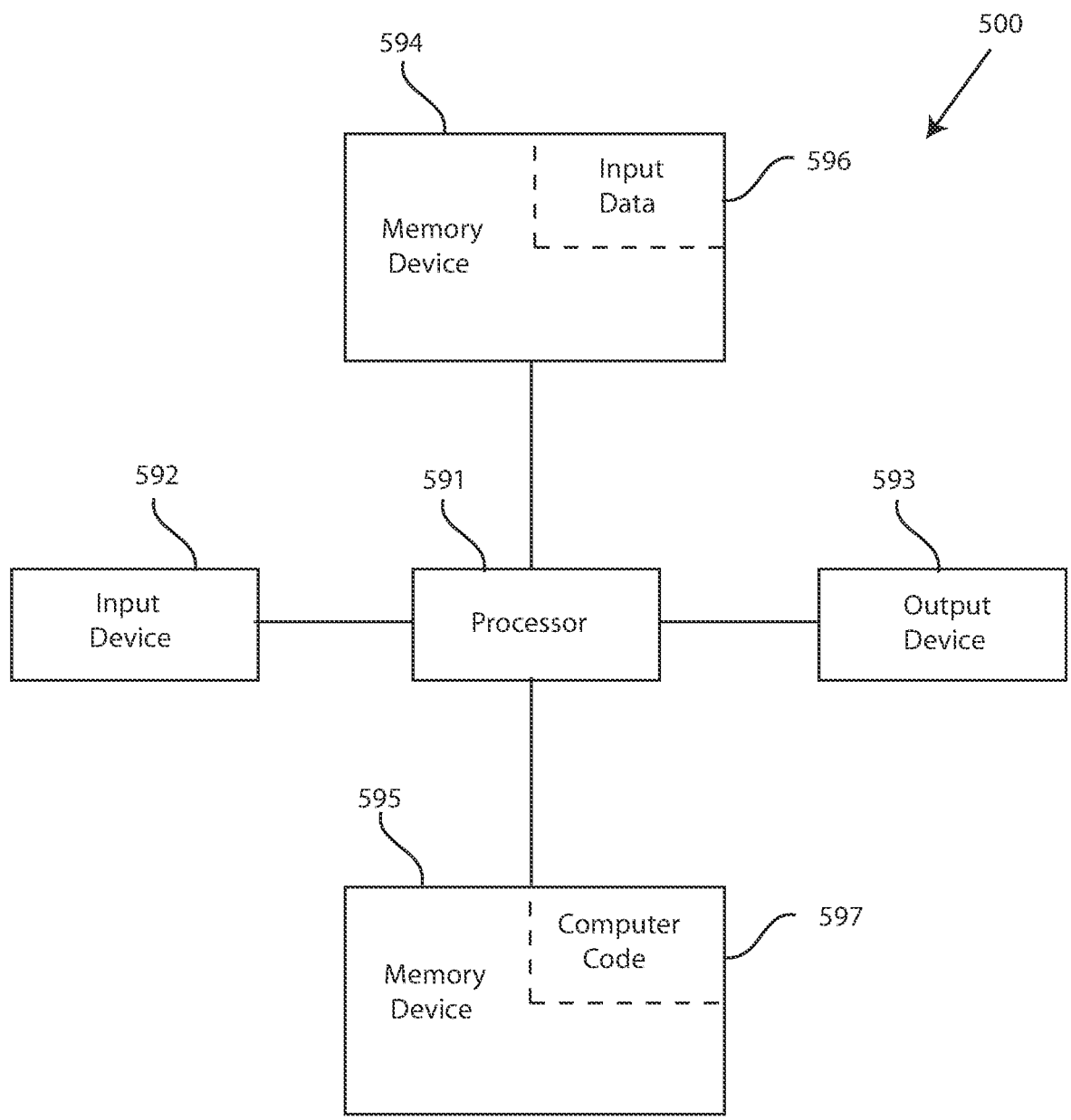
FIG. 7 depicts a block diagram of a computer system capable of implementing methods for analyzing a product, in accordance with embodiments of the present invention.

FIG. 7 illustrates a block diagram of a computer system that may representative of any computer or computer system within the system for analyzing a product of FIG. 1, capable of implementing methods for analyzing a product of FIGS. 3-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for analyzing a product, in the manner prescribed by the embodiments of FIGS. 3-5 using the system for masking data of FIG. 1, wherein the instructions of the computer code 597 may be executed by processor 591 via memory device 595. The computer code 597 may include software or program instructions that may implement one or more algorithms for implementing the methods for masking data, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for masking data. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system for masking data. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for masking data. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for analyzing a product.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
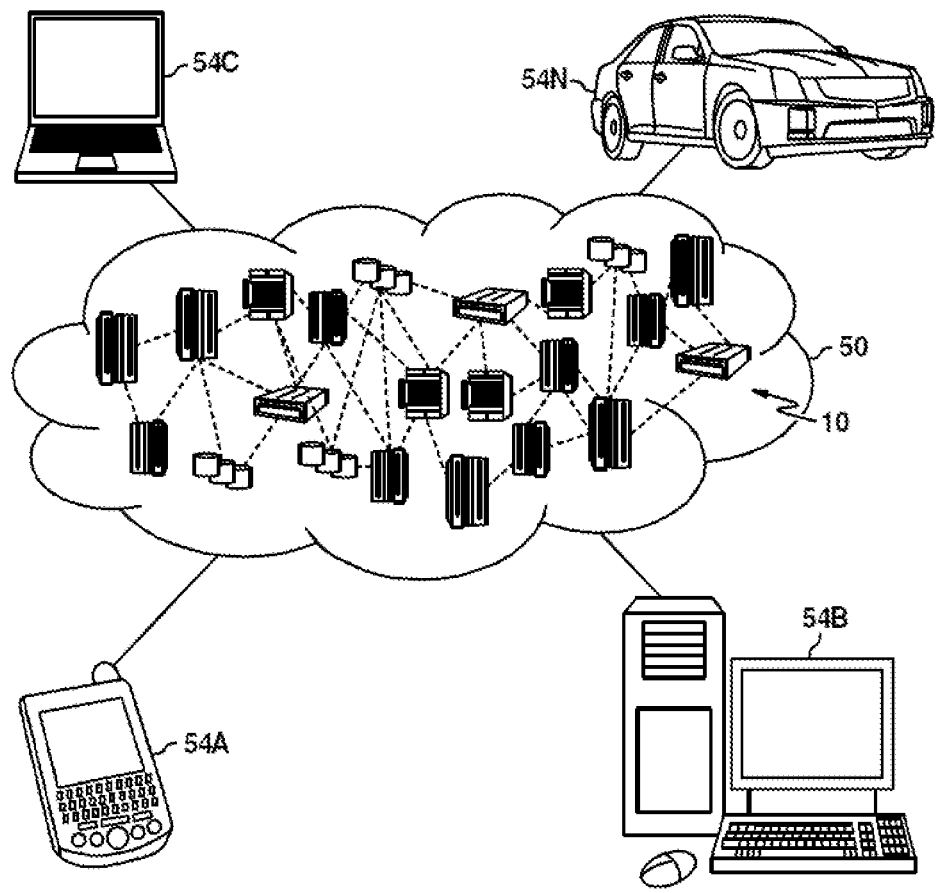
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, such as a mobile device 111, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
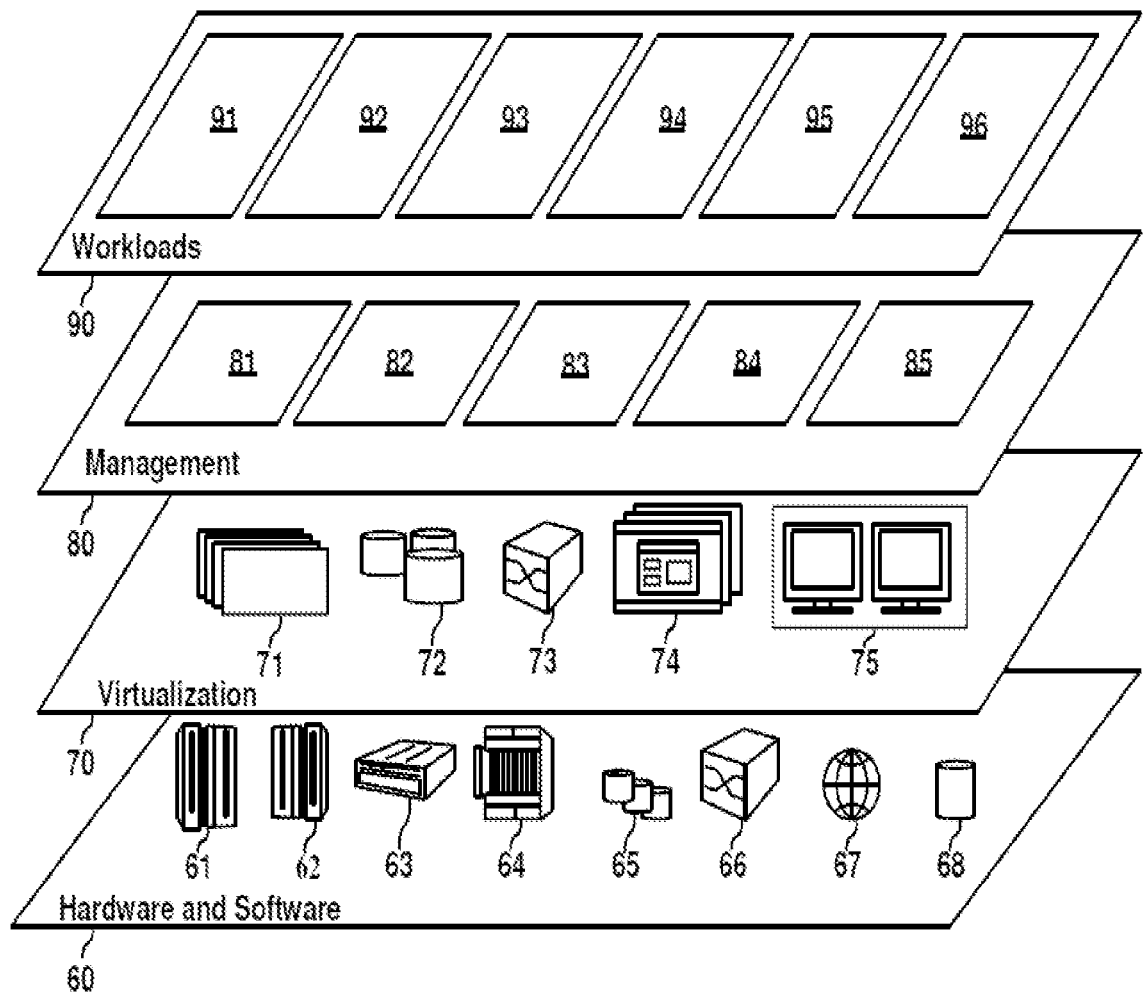
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to analyzing a product 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
receiving, by one or more processors of a computer system, a scan of a product;
retrieving, by the one or more processors of the computer system, a plurality of individual data corresponding to one or more individuals, the plurality of individual data including one or more medical conditions and an indication of one or more medications for at least one individual of the one or more individuals, wherein the one or more individuals is a defined group of individuals;
determining, by an artificial intelligence (AI) system of the one or more processors of the computer system, how the product will affect the plurality of individual data of each individual of the defined group of individuals including the one or more medical conditions and one or more medications and whether the product will comply with the plurality of individual data of the one or more individuals of the defined group of individuals, by processing, by the AI system of the one or more processors of the computer system the retrieved plurality of individual data;
correlating, by the AI system of the one or more processors of the computer system, the one or more medical conditions and one or more medications against potential negative and positive impacts of the products, wherein the potential negative and positive impacts comprise at least a negative side effect caused by an interaction between the product and the one or more medical conditions or the one or more medications;
dynamically reassigning processing resources from a shared pool of the one or more processors based on a monitored demand;
initially training the AI system using data from at least one database including a multiple factor analytics database, the at least one database having the correlations between the one or more medical conditions and one or more medications against potential negative and positive impacts of the products, the at least one database comprising information relating to the potential negative and positive impacts of the products for the range of possible medical conditions and personal preferences;
generating, by the one or more processors of the computer system, an alert corresponding to the product based on the determining;
sending, by the one or more processors of the computer system, the alert to a user device before purchase of the product;
generating, by the one or more processors of the computer system, a recommendation for an alternative product based on the determining;
receiving, by the one or more processors of the computer system, a selection choice between the product and the alternative product; and
further training the AI system to identify one or more preferred products of the one or more individuals, the training including iteratively processing, by the AI system, previously received selection choices to train, update, and optimize the AI system to identify the one or more preferred products based on correlations between previously generated alerts corresponding to the product and the previously received selection choices.

2. The method of claim 1, further comprising:
retrieving, by the one or more processors of the computer system, a previously received selection choice made by a user, the previously received selection choice being between the product and the alternative product; and
executing the AI system of the one or more processors to train the computer system to identify a plurality of alternative products for recommendation based on the retrieved previously received selection choices made by the user.

3. The method of claim 1, further comprising:
iteratively processing, by the AI system of the one or more processors of the computer system, updated previously received selection choices to train, update, and optimize the AI system to identify preferred products or preferred alternative products based on correlations between previously generated alerts corresponding to the product or previously generated recommendations of alternative products, and updated previously received selection choices.

4. The method of claim 1, further comprising, receiving, by the one or more processors of the computer system, the plurality of individual data of the one or more individuals.

5. The method of claim 1, further comprising:
receiving, by the one or more processors of the computer system, an updated plurality of individual data of the one or more individuals,
wherein the determining includes determining, by the one or more processors of the computer system, how the product will affect the updated plurality of individual data of the one or more individuals and whether the product will comply with the updated plurality of individual data of the one or more individuals.

6. The method of claim 1, wherein the product is a grocery item, wherein the plurality of individual data includes medical data, dietary preferences, and personal goals of the one or more individuals, and wherein the medical data includes one or more medical data selected from a group of medical data consisting of medical health conditions of the one or more individuals, medications taken by the one or more individuals, lab test results for the one or more individuals, and allergies of the at least one individual,
wherein the dietary preferences include one or more dietary preferences selected from a group of dietary preferences consisting of religious dietary restrictions of the one or more individuals, vegan dietary restrictions of the one or more individuals, vegetarian dietary restrictions of the one or more individuals, diet plan restrictions of the one or more individuals, organic ingredient preferences of the one or more individuals, and natural ingredient preferences of the one or more individuals, and
wherein the personal goals include one or more personal goals selected from a group of goals consisting of weight loss goals of the one or more individuals, medical health condition improvement of the one or more individuals, and health condition maintenance of the one or more individuals.

7. The method of claim 1, wherein the product is a grocery item, wherein the plurality of individual data includes medical data, dietary preferences, and personal goals of each individual of the defined group of individuals, and wherein the medical data includes one or more medical data selected from a group of medical data consisting of medical health conditions of each individual of the defined group of individuals, medications taken by each individual of the defined group of individuals, lab test results for each individual of the defined group of individuals, and allergies of each individual of the defined group of individuals,
wherein the dietary preferences include one or more dietary preferences selected from a group of dietary preferences consisting of religious dietary restrictions of each individual of the defined group of individuals, vegan dietary restrictions of each individual of the defined group of individuals, vegetarian dietary restrictions of each individual of the defined group of individuals, diet plan restrictions of each individual of the defined group of individuals, organic ingredient preferences of each individual of the defined group of individuals, and natural ingredient preferences of each individual of the defined group of individuals; and
wherein the personal goals include one or more personal goals selected from a group of goals consisting of weight loss goals of each individual of the defined group of individuals, medical health condition improvement of each individual of the defined group of individuals, and health condition maintenance of each individual of the defined group of individuals.

8. A computer system comprising:
one or more processors;
one or more memory devices coupled to the one or more processors; and
one or more computer readable storage devices coupled to one or more processors,
wherein the one or more storage devices contain program code executable by the one or more processors via the one or more memory devices to implement a method of analyzing products using an artificial intelligence (AI) system of the one or more processors of the computer system, the method comprising:
receiving, by one or more processors of the computer system, a scan of a product;
retrieving, by the one or more processors of the computer system, a plurality of individual data corresponding to one or more individuals, the plurality of individual data including one or more medical conditions and an indication of one or more medications for at least one individual of the one or more individuals, wherein the one or more individuals is a defined group of individuals;
determining, by the AI system of the one or more processors of the computer system, how the product will affect the plurality of individual data of each individual of the defined group of individuals including the one or more medical conditions and one or more medications and whether the product will comply with the plurality of individual data of the one or more individuals of the defined group of individuals, by processing, by the AI system of the one or more processors of the computer system the retrieved plurality of individual data;
correlating, by the AI system of the one or more processors of the computer system, the one or more medical conditions and one or more medications against potential negative and positive impacts of the products, wherein the potential negative and positive impacts comprise at least a negative side effect caused by an interaction between the product and the one or more medical conditions or the one or more medications;
dynamically reassigning processing resources from a shared pool of the one or more processors based on a monitored demand;
initially training the AI system using data from at least one database including a multiple factor analytics database, the at least one database having the correlations between the one or more medical conditions and one or more medications against potential negative and positive impacts of the products, the at least one database comprising information relating to the potential negative and positive impacts of the products for the range of possible medical conditions and personal preferences;
generating, by the one or more processors of the computer system, an alert corresponding to the product based on the determining;
sending, by the one or more processors of the computer system, the alert to a user device before purchase of the product;

generating, by the one or more processors of the computer system, a recommendation for an alternative product based on the determining;

receiving, by the one or more processors of the computer system, a selection choice between the product and the alternative product; and further training the AI system to identify one or more preferred products of the one or more individuals, the training including iteratively processing, by the AI system, previously received selection choices to train, update, and optimize the AI system to identify the one or more preferred products based on correlations between previously generated alerts corresponding to the product and the previously received selection choices.

9. The computer system of claim 8, wherein the method further comprises:

receiving, by the one or more processors of the computer system, an updated plurality of individual data of the one or more individuals, wherein the determining includes determining, by the one or more processors of the computer system, how the product will affect the updated plurality of individual data of the one or more individuals and whether the product will comply with the updated plurality of individual data of the one or more individuals.

10. The computer system of claim 8, the method further comprising:

retrieving, by the one or more processors of the computer system, a previously received selection choice made by a user, the previously received selection choice being between the product and the alternative product; and executing the AI system of the one or more processors to train the computer system to identify a plurality of alternative products for recommendation based on the retrieved previously received selection choices made by the user.

11. The computer system of claim 8, the method further comprising:

iteratively processing, by the AI system of the one or more processors of the computer system, previously received selection choices to train, update, and optimize the AI system to identify preferred alternative products based on correlations between previously generated alerts corresponding to previously generated recommendations of alternative products and previously received selection choices.

12. A computer program product, comprising a computer readable hardware storage device storing a computer readable program code, the computer readable program code comprising an algorithm that when executed by one or more processors of a computer system implements a method for analyzing products using an artificial intelligence (AI) system of the one or more processors of the computer system, the method comprising:

receiving, by one or more processors of a computer system, a scan of a product;

retrieving, by the one or more processors of the computer system, a plurality of individual data corresponding to one or more individuals, the plurality of individual data including one or more medical conditions and an indication of one or more medications for at least one individual of the one or more individuals, wherein the one or more individuals is a defined group of individuals;

determining, by the AI system of the one or more processors of the computer system, how the product will affect the plurality of individual data of each individual of the defined group of individuals including the one or more medical conditions and one or more medications and whether the product will comply with the plurality of individual data of the one or individuals of the defined group of individuals, by processing, by the AI system of the one or more processors of the computer system the retrieved plurality of individual data;

correlating, by the AI system of the one or more processors of the computer system, the one or more medical conditions and one or more medications against potential negative and positive impacts of the products, wherein the potential negative and positive impacts comprise at least a negative side effect caused by an interaction between the product and the one or more medical conditions or the one or more medications;

dynamically reassigning processing resources from a shared pool of the one or more processors based on a monitored demand;

initially training the AI system using data from at least one database including a multiple factor analytics database, the at least one database having the correlations between the one or more medical conditions and one or more medications against potential negative and positive impacts of the products, the at least one database comprising information relating to the potential negative and positive impacts of the products for the range of possible medical conditions and personal preferences;

generating, by the one or more processors of the computer system, an alert corresponding to the product based on the determining;

sending, by the one or more processors of the computer system, the alert to a user device before purchase of the product;

generating, by the one or more processors of the computer system, a recommendation for an alternative product based on the determining;

receiving, by the one or more processors of the computer system, a selection choice between the product and the alternative product; and further training the AI system to identify one or more preferred products of the one or more individuals, the training including iteratively processing, by the AI system, previously received selection choices to train, update, and optimize the AI system to identify the one or more preferred products based on correlations between previously generated alerts corresponding to the product and the previously received selection choices.

13. The computer program product of claim 12, wherein the method further comprises:

receiving, by the one or more processors of the computer system, an updated plurality of individual data of the one or more individuals, wherein the determining includes determining, by the one or more processors of the computer system, how the product will affect the updated plurality of individual data of the one or more individuals and whether the product will comply with the updated plurality of individual data of the one or more individuals.

14. The computer program product of claim 12, the method further comprising:

retrieving, by the one or more processors of the computer system, a previously received selection choice made by a user, the previously received selection choice being between the product and the alternative product; and executing the AI system of the one or more processors of the computer system to train the computer system to identify a plurality of alternative products for recommendation based on the retrieved previously received selection choices made by the user.

15. The computer program product of claim 12, the method further comprising:
iteratively processing, by the AI system of the one or more processors of the computer system, previously received selection choices to train, update, and optimize the AI system to identify preferred alternative products based on correlations between previously generated alerts corresponding to previously generated recommendations of alternative products, and previously received selection choices.

16. The computer program product of claim 12, wherein the product is a grocery item, wherein the plurality of individual data includes medical data, dietary preferences, and personal goals of the one or more individuals, and wherein the medical data includes one or more medical data selected from a group of medical data consisting of medical health conditions of the one or more individuals, medications taken by the one or more individuals, lab test results for the one or more individuals, and allergies of the at least one individual,
wherein the dietary preferences include one or more dietary preferences selected from a group of dietary preferences consisting of religious dietary restrictions of the one or more individuals, vegan dietary restrictions of the one or more individuals, vegetarian dietary restrictions of the one or more individuals, diet plan restrictions of the one or more individuals, organic ingredient preferences of the one or more individuals, and natural ingredient preferences of the one or more individuals, and
wherein the personal goals include one or more personal goals selected from a group of goals consisting of weight loss goals of the one or more individuals, medical health condition improvement of the one or more individuals, and health condition maintenance of the one or more individuals.

17. The computer system of claim 8, wherein the product is a grocery item, wherein the plurality of individual data includes medical data, dietary preferences, and personal goals of the one or more individuals, and wherein the medical data includes one or more medical data selected from a group of medical data consisting of medical health conditions of the one or more individuals, medications taken by the one or more individuals, lab test results for the one or more individuals, and allergies of the at least one individual,
wherein the dietary preferences include one or more dietary preferences selected from a group of dietary preferences consisting of religious dietary restrictions of the one or more individuals, vegan dietary restrictions of the one or more individuals, vegetarian dietary restrictions of the one or more individuals, diet plan restrictions of the one or more individuals, organic ingredient preferences of the one or more individuals, and natural ingredient preferences of the one or more individuals, and
wherein the personal goals include one or more personal goals selected from a group of goals consisting of weight loss goals of the one or more individuals, medical health condition improvement of the one or more individuals, and health condition maintenance of the one or more individuals.

18. The method of claim 1, wherein initially training the AI system comprises using data corresponding to the plurality of individual data of the one or more individuals of the defined group of individuals including medical data, dietary preferences, and personal goals of the one or more individuals of the defined group of individuals, wherein the medical data includes the indication of the one or more medications.

19. The computer system of claim 8, wherein the initially training the AI system includes using data corresponding to the plurality of individual data of the one or more individuals of the defined group of individuals including medical data, dietary preferences, and personal goals of the one or more individuals of the defined group of individuals, wherein the medical data includes the indication of the one or more medications.

20. The computer system of claim 8, wherein the product is a grocery item, wherein the plurality of individual data includes medical data, dietary preferences, and personal goals of each individual of the defined group of individuals, and wherein the medical data includes one or more medical data selected from a group of medical data consisting of medical health conditions of each individual of the defined group of individuals, medications taken by each individual of the defined group of individuals, lab test results for each individual of the defined group of individuals, and allergies of each individual of the defined group of individuals,
wherein the dietary preferences include one or more dietary preferences selected from a group of dietary preferences consisting of religious dietary restrictions of each individual of the defined group of individuals, vegan dietary restrictions of each individual of the defined group of individuals, vegetarian dietary restrictions of each individual of the defined group of individuals, diet plan restrictions of each individual of the defined group of individuals, organic ingredient preferences of each individual of the defined group of individuals, and natural ingredient preferences of each individual of the defined group of individuals; and
wherein the personal goals include one or more personal goals selected from a group of goals consisting of weight loss goals of each individual of the defined group of individuals, medical health condition improvement of each individual of the defined group of individuals, and health condition maintenance of each individual of the defined group of individuals.

* * * * *